Figures 1, 2:
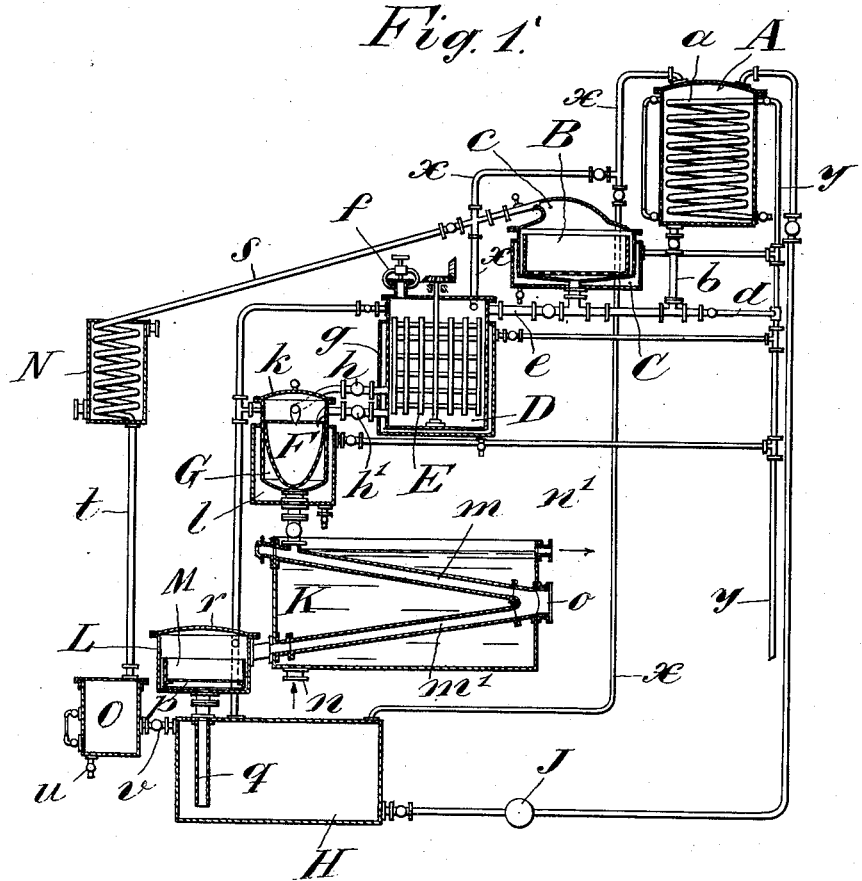

No. 833,573. PATENTED OCT. 16, 1906.
J. J. M. BÉCIGNEUL.
EXTRACTION OF SULFUR FROM GAS PURIFYING MATERIALS.
APPLICATION FILED JULY 19, 1905.

Witnesses:
J. W. Kiman
William J. Firth

Inventor:
Joseph Jules Marie Bécigneul
By Henry Connett
Attorney

UNITED STATES PATENT OFFICE.

JOSEPH JULES MARIE BÉCIGNEUL, OF NANTES, FRANCE.

EXTRACTION OF SULFUR FROM GAS-PURIFYING MATERIALS.

No. 833,573.  Specification of Letters Patent.  Patented Oct. 16, 1906.

Application filed July 19, 1905. Serial No. 270,374.

*To all whom it may concern:*

Be it known that I, JOSEPH JULES MARIE BÉCIGNEUL, a citizen of the French Republic, residing in Nantes, Loire Inférieure, France, have invented certain new and useful Improvements in the Extraction of Sulfur from Gas-Purifying Materials, of which the following is a specification.

This invention relates to the treatment of spent-gas-purifying materials; and its main object is to extract the sulfur therefrom, this allowing of subsequently removing cyanids contained in such purifying materials.

The invention is based upon the employment of hot benzin or toluene for extracting and removing the sulfur. After the toluene has been allowed to exert its action upon the materials to be treated it is subjected to the action of carbonaceous material in finely-divided form, hereinafter referred to as "black," which expression includes generally any porous material containing carbon. The toluene may be filtered through the black. It is preferred to stir or agitate it with the black and to effect then the separation of the carbon which retains the tars carried with the toluene. Certain blacks can be used more advantageously than others to thus arrest the tars carried with the toluene. It is preferred to add tetrachlorid of carbon to the toluene, this being itself a solvent of sulfur and renders the toluene practically uninflammable.

While the proportions of the materials employed may be varied somewhat, the following procedure will produce good results: For the treatment of one hundred kilos of gas-purifying material containing about thirty kilos of sulfur I may employ about three hundred and forty kilos of toluene and about eighty kilos of carbon tetrachlorid to completely desulfurize the material treated. In order to clarify the mixture, about ten kilos of bone-black will be required. The sulfur dissolved and carried away with the toluene is precipitated therefrom by cooling the toluene. The various elements and vessels composing the apparatus which I employ for this treatment are arranged in such manner as to provide for an equality of pressure between all parts of the apparatus in order that the toluene can be decanted or run from one container into another without necessity for opening air-cocks, which would permit the toluene vapors to escape into the atmosphere.

The details of the invention will be understood from the following description and upon reference to the annexed drawings, in which—

Figure 1 represents a general view of an apparatus suited for the purpose, and Fig. 2 is an enlarged sectional view of one of the condensing-pipes.

This apparatus is not claimed in the present application; but the drawings thereof are employed herein to better illustrate the method or process claimed.

The cold toluene, supplied from any suitable source—for example, from the reservoir H, in which it is collected at the end of the work and from which it is raised by the pump J into the reservoir A—is heated to a temperature of about 105° centigrade by a steam-coil $a$. Instead of using pure toluene it is preferred to employ a mixture of toluene and tetrachlorid of carbon, this latter rendering the toluene practically uninflammable without reducing the solvent action of the liquid upon the sulfur.

The heated toluene is led by the pipe $b$ into the container B, which is provided with a steam-jacket C and is adapted to receive the gas-purifying material to be treated, this latter being placed in a basket. The toluene is admitted at the bottom of the vessel B, so as not to cause sinking or settling of the material. The cover of the vessel B is removable and is adapted to be opened by turning on a shaft. This cover is surmounted by a wide neck $c$, adapted to allow of ready disengagement of the toluene vapors under the action of steam which is admitted at the required time to the vessel B. The steam which enters at $d$ is likewise admitted below the vessel B.

When the toluene has been in contact with the purifying materials in the vessel B for a sufficient time to dissolve all the sulfur, it is run into the vessel D, provided with a steam-circulation jacket $g$. When all the toluene has been thus run from B to D by the pipe $e$, the toluene with which the materials remain charged is driven off by means of steam which is admitted at $d$.

The toluene which enters the vessel D is charged with sulfur in solution and likewise contains tars. The toluene is treated with the black in the vessel D, being introduced through a stoppered orifice $f$ at the upper part of the vessel. The toluene and carbonaceous material are intimately mixed by means of an agitator of any suitable kind— for example, as shown by a rotary stirrer E, mounted on a vertical shaft and composed of agitating-blades. This mixture is necessary to produce complete absorption of the tars by the black.

For the purpose of the invention blacks of varying composition may be employed, and generally any porous material containing carbon may be used, such as coke, wood charcoal, different blacks, and even calcined tars. When the operation has been carried on for a certain time with fresh black, this latter becomes charged with such a quantity of tar that it is necessary to revivify it by calcination. It is then found that the absorbed tar, which is reduced to the state of infinitesimal subdivision, is carbonized during the revivification and itself becomes a very good black for absorbing the tars, so that the black revivified under these conditions is more active than the fresh black.

After agitating the black for a suitable time with the toluene charged with sulfur and tars the mixture is allowed to settle, when the black falls to the bottom of the vessel D in the form of sludge. The clear liquid is decanted off by the upper pipe, fitted with a cock h, and is led into the filter F. The muddy liquid is then run off by the pipe disposed at a lower point than that just mentioned and fitted with a valve h'. The filter F is disposed in a vessel G, fitted with a removable cover k to allow of changing the filter. The vessel G is likewise provided with a steam-jacket l.

The clear liquid which passes through the filter F after depositing therein the black which it contains is received in the pipes m, disposed in a vessel K, supplied with cold water. An upward circulation of cold water is maintained in this vessel K, which is provided with inlet and outlet unions n n' for the water. The pipes m m', in which the hot sulfur-charged toluene descends, are of lenticular form, almost flat at the bottom or back, as shown on a larger scale in Fig. 2. The pipes are of thin sheet-iron and are slightly inclined. As the result of the cooling the sulfur is precipitated; but it is still carried along with the toluene, which descends into the vessel L. An inspection-hole is provided at o, at the junction of the pipes m m', to allow of inspecting and cleaning these pipes.

The sulfur carried with the toluene is arrested in a basket M, provided with a wire-gauze bottom p, while the liquid passes through the same and returns to the receiver H through q. The vessel L is fitted with a removable cover r to allow of withdrawing the basket M from time to time for the purpose of removing the sulfur.

It has been already explained that the toluene remaining behind in the purifying materials contained in the vessel B is vaporized by steam caused to traverse the said materials. The toluene-vapor and steam which escape through the trapped pipe c pass through the pipe s to the condenser N, which is cooled by a circulation of cold water. The condensation-water and liquid toluene run down through t into the separator O. The two liquids separate by gravity. The water, which is heavier than the toluene, descends to the bottom and is run out through the purge-cock u, while the condensed toluene is returned by the pipe v to the receiver H. The whole of the liquid toluene, mixed or not with tetrachlorid of carbon, is thus recovered and returns to the general circulation, as before explained.

The black collected in the filter F and the sulfur deposited in the basket M are dried in retorts which are common to a number of series or sets of apparatus, so that the toluene with which these substances are impregnated may also be recovered, thus avoiding all loss of solvent.

All the containers and vessels composing an apparatus or set are connected together by pipes lettered x. These pipes serve to equalize the pressure between all these containers and vessels, so as to allow of rapid decantation or transference of the liquid without loss. The pipe y serves for the admission of steam at about 105° centigrade for heating the toluene in the vessel A and for circulating the steam through the jackets of the various vessels, so as to maintain the toluene at a suitable temperature, since it is only in the vessel K that the cooled toluene gives up its sulfur by precipitation.

Under the names "benzene" and "toluene," as herein employed to designate suitable liquid solvents, are meant to be included such volatile liquid hydrocarbons similar to these which will dissolve out the sulfur.

What I claim, and desire to secure by Letters Patent, is—

1. The process of extracting sulfur from spent-gas-purifying materials, which consists in first treating the material with a volatile hydrocarbon of the character described heated to a temperature of about 105° centigrade, to dissolve out the sulfur and tars, then subjecting the solution to filtration to remove the tars, and then precipitating the sulfur by cooling the solution.

2. The process of extracting sulfur from spent-gas-purifying materials, which consists in first treating the material with toluene heated to a temperature of about 105° centigrade, to dissolve out the sulfur and tars, then subjecting the solution to filtration to remove the tars, and then precipitating the sulfur by cooling the solution.

3. The process of extracting sulfur from spent-gas-purifying materials, which consists in first treating the material with toluene heated to a temperature of about 105° centigrade, to dissolve out the sulfur and tar, then removing tar from said solution by adding bone-black thereto and agitating, then decanting and filtering the hot solution, and then precipitating the sulfur therefrom by cooling.

In witness whereof I have hereunto signed my name, this 5th day of July, 1905, in the presence of two subscribing witnesses.

JOSEPH JULES MARIE BÉCIGNEUL.

Witnesses:
T. BALLAIRE,
L. C. ALLEYNE.